US010845206B2

(12) United States Patent
Tumuluru et al.

(10) Patent No.: US 10,845,206 B2
(45) Date of Patent: Nov. 24, 2020

(54) SUGGESTING PICKUP LOCATIONS FOR TRANSPORT SERVICE COORDINATION

(71) Applicant: Uber Technologies, Inc., San Francisco, CA (US)

(72) Inventors: Anand Karthik Tumuluru, Bengaluru (IN); Gaurang Ramakant Khetan, Bengaluru (IN); Sundar Annamalai, Mountain View, CA (US); Jun Ma, Concord, CA (US); Atrem Kizil, Seattle, WA (US)

(73) Assignee: Uber Technologies, Inc., San Francisco, CA (US)

( * ) Notice: Subject to any disclaimer, the term of this patent is extended or adjusted under 35 U.S.C. 154(b) by 148 days.

(21) Appl. No.: 16/234,281

(22) Filed: Dec. 27, 2018

(65) Prior Publication Data

US 2020/0208999 A1 Jul. 2, 2020

(51) Int. Cl.
*G01C 21/34* (2006.01)
*G06Q 50/30* (2012.01)
(Continued)

(52) U.S. Cl.
CPC ..... *G01C 21/3438* (2013.01); *G01C 21/3461* (2013.01); *G06Q 50/30* (2013.01);
(Continued)

(58) Field of Classification Search
CPC .... G06Q 10/0837; G06Q 20/10; G06Q 50/30; G06Q 10/0835; G06Q 10/08355; G06Q 20/18; G06Q 30/0215; G06Q 20/342; G06Q 10/0631; G06Q 50/10; G01C 21/34; G01C 21/3461; G01C 21/3438; G01C 21/3415; G01C 21/343; G01C 21/3446; G01C 21/3492; G08G 1/00; G08G 1/096725; G08G 1/095; G08G 1/09623; G08G 1/0955; G08G 1/202; G06K 9/00805;
(Continued)

(56) References Cited

U.S. PATENT DOCUMENTS 6,192,314 B1 * 2/2001 Khavakh ................ G01C 21/34
701/410
10,198,707 B1 * 2/2019 Bolton ............. G06Q 10/08355
(Continued)

*Primary Examiner* — Behrang Badii
(74) *Attorney, Agent, or Firm* — Fenwick & West LLP

(57) ABSTRACT

A network system coordinates transport service between service providers and service requestors operating client devices in a system environment. Service requestors request transport service from a requestor location to a destination location. Service providers provide transport service to service requestors using a transportation vehicle. Network system can suggest a pickup location nearby the requestor location. The suggested pickup location can be on a road segment that is nearby the requestor location, on a navigable road segment, address matched to the requestor location, and on an accessible road segment. Nearby road segments are less than a threshold distance from the requestor location. Navigable road segments have a navigable road type. Address matched road segments are have an alphanumeric location name similar to that of the requestor location. A network system provides the suggested pickup location to a service requestor to facilitate transport service.

20 Claims, 13 Drawing Sheets

(51) Int. Cl.
  *G06Q 30/06*    (2012.01)
  *G06Q 10/08*    (2012.01)
(52) U.S. Cl.
  CPC ......... *G06Q 10/08* (2013.01); *G06Q 10/0835* (2013.01); *G06Q 10/0837* (2013.01); *G06Q 30/06* (2013.01)
(58) Field of Classification Search
  CPC ............ G06K 9/4628; G06K 9/00818; G06K 9/6273; G06K 9/00825; G06K 9/00369; G06K 9/6274; G06K 9/00791; G01S 17/86; G01S 17/931; G01S 17/89; G01S 17/42; G01S 17/87; G05D 1/0289; G05D 1/0027; G05D 1/0278; G05D 1/0257; H04W 4/14; G07F 17/329; G07B 15/02; B60W 30/00; B60W 40/04; B60W 30/10
  See application file for complete search history.

(56) References Cited

U.S. PATENT DOCUMENTS

| | | | | |
|---|---|---|---|---|
| 2016/0012465 A1* | 1/2016 | Sharp | ................... | G06Q 20/10 705/14.17 |
| 2016/0078688 A1* | 3/2016 | Behr | ................... | G06Q 50/30 705/13 |
| 2017/0371348 A1* | 12/2017 | Mou | ................... | G01S 17/86 |
| 2018/0357907 A1* | 12/2018 | Reiley | ................... | G08G 1/202 |

* cited by examiner

SUGGESTING PICKUP LOCATIONS FOR TRANSPORT SERVICE COORDINATION

FIELD

This description relates generally to suggesting a pickup location for a transportation service and more particularly suggesting a pickup location based on a location name and location coordinate.

DESCRIPTION OF RELATED ART

Coordinating high-quality services between service requestors and service providers using a network system within a system environment can be a challenging problem. In particular, with so many variables that can affect the quality of service coordination within the environment, ensuring high-quality service coordination for all parties participating in the service coordination is complex and error-prone. For example, something such as suggesting a convenient pickup location for a service requestor for a transport service can be difficult.

In many circumstances, a service requestor is suggested an inconvenient pickup location. For example, a service requestor may be suggested a pickup location in a back alley or a pickup location that is several blocks away. Whatever the case, when a network system suggests an inconvenient pickup location, the quality of the transport service is reduced. Therefore, a method for suggesting a pickup location that is convenient for the service requestor would be beneficial.

SUMMARY

A network system determines a suggested pickup location for a transport service in a road network of an environment as service providers and service requesters coordinate service using in the area. Efficiently determining a suggested pickup location that is nearby, navigable, addressed matched, and accessible is challenging when the types of road segments in a network are highly variable. Accordingly, the network system determines a suggested pickup location by filtering pickup locations based on the information associated with the road segment on which the pickup location is located. For example, the network system may filter the pickup locations based on the proximity of the pickup location to a service requestor (i.e., nearby), the type of road segment on which the pickup location is located (i.e., navigable), the alphanumeric string describing the pickup location (i.e., address matched), and the number of road segments a service requestor may have to cross when travelling to the pickup location (i.e., accessible). The network system selects a pickup location that is nearby, navigable, address matched, and accessible and suggest that pickup location to a service requestor requesting transport service.

The network system determines that a pickup location is addressed matched using a particular method. A service requestor sends the network system a location coordinate describing their current location. The location coordinate is associate with a location name describing that coordinate. The location name is generally an alphanumeric string describing the location coordinate in a road network. When determining a suggested pickup location, the network system compares the alphanumeric location name describing the location of the service requestor to the alphanumeric location names of the road segments on which potential pickup locations are located. The network system determines an edit distance ratio score, a relative edit distance score, an alphanumeric edit distance score, and a numeric edit distance score quantifying the differences between the two alphanumeric location names. Pickup locations having scores above (or below) threshold scores can be determined as suggested pickup locations.

The network system determines that a pickup location is accessible using a particular method. The network system generates an edge representing each of the road segments on which each of the possible pickup locations is located. The edge is a polyline connecting the beginning coordinate and ending coordinate of the road segment. The network system classifies the edge as unnamed or named based on information describing the road segment in the network system. The network system generates a path from the service requestor location to the edge. The path is a polyline connecting the location coordinate to the edge representing the road segment. Any number or types of paths are possible. For example, a path may connect a starting location to a midpoint of an edge, to the endpoint of the edge, a number of points on an edge, etc. The network system determines a number of edge crossings for each edge. An edge crossing is the number of times a path crosses another edge. Accessible pickup locations are pickup locations that have zero or one edge crossings.

The figures depict various embodiment for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to various embodiments by way of illustration only. It should be noted that from the following discussion, alternative embodiments of the structures and methods disclosed herein will be readily recognized as viable alternatives that may be employed without departing from the principles of what is claimed.

I. System Environment

Network systems have been used to facilitate service coordination between two parties operating client devices within a system environment. For example, a network system may be used to coordinate a transportation service between a service requestor (e.g., a user operating a client device) and a service provider (e.g., a user operating a client device) via a network. In one example, a service provider may provide transportation to a service requestor from a pickup location to a destination location.

In some instances, a service requestor is not located at a position with a convenient pickup location for transport service. For example, a service requestor may be inside a building or far from any roads. In these instances, a network system can determine a suggested pickup location for the service requestor such that the service requestor can easily obtain transport service from a service provider. For example, a network system can suggest the nearest road that could act as a pickup location for a transport service.

The methods of determining and suggesting a pickup location described herein are more efficient and more robust than traditional pickup location determination and suggestion algorithms. Take, for example, an algorithm that uses a cost function to determine and suggest a pickup location for a route with a pickup location in the city location and a destination location in a neighborhood. Here, the cost function may analyze every location near the pickup location to determine an appropriate pickup location. This type of "brute force" approach is both computationally expensive and inefficient because many of the analyzed locations are not suitable for use as a pickup location. Thus, as described herein, a method of filtering the possible pickup locations such that suggested pickup locations are nearby, navigable, address matched, and accessible may be more efficient because it analyzes fewer total pickup locations when determining a suggested pickup location.

II. Service Coordination

Figure 1:
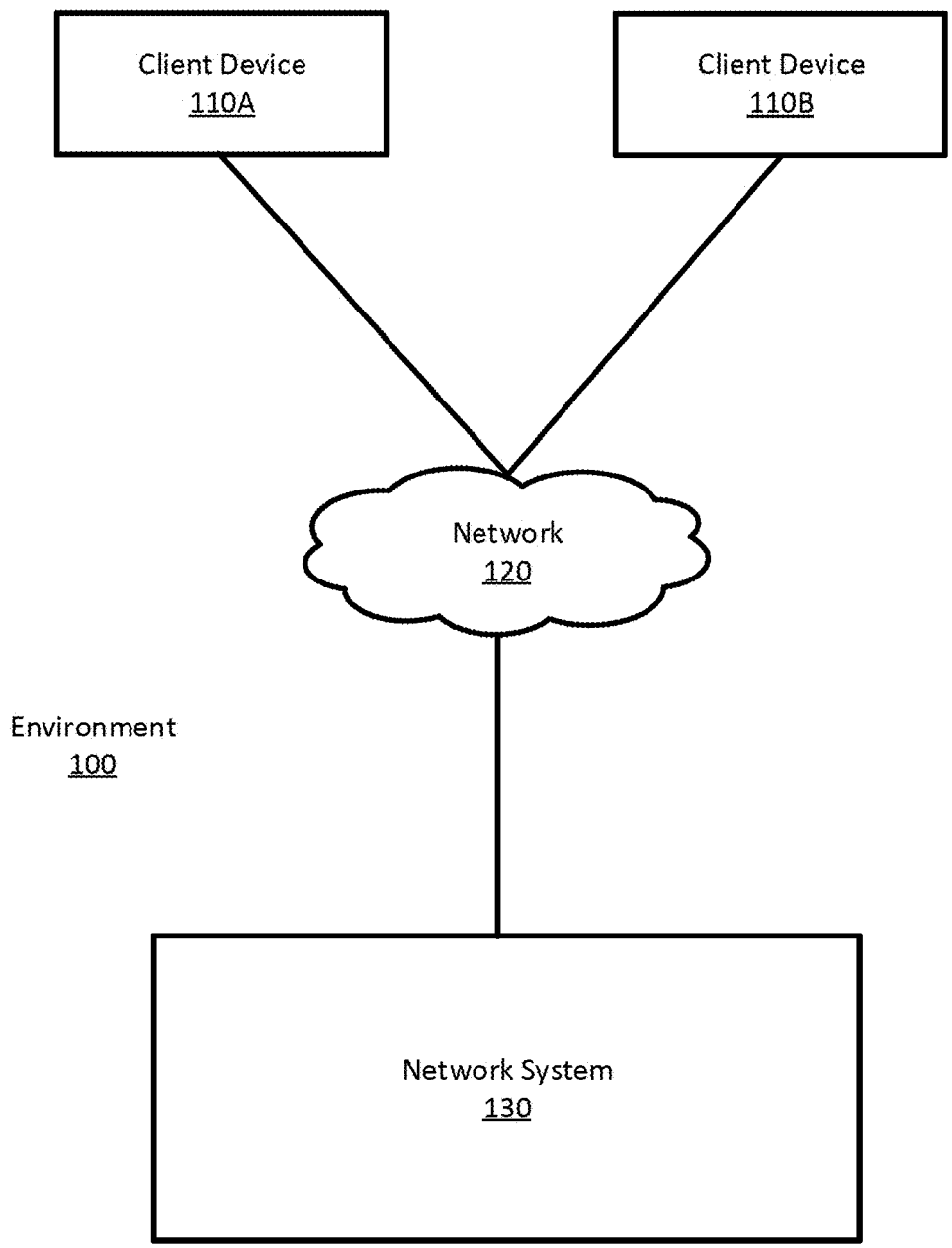
FIG. 1 is an illustration of a system environment for suggesting a pickup location to a service requestor, according to one example embodiment.
Figure 2:
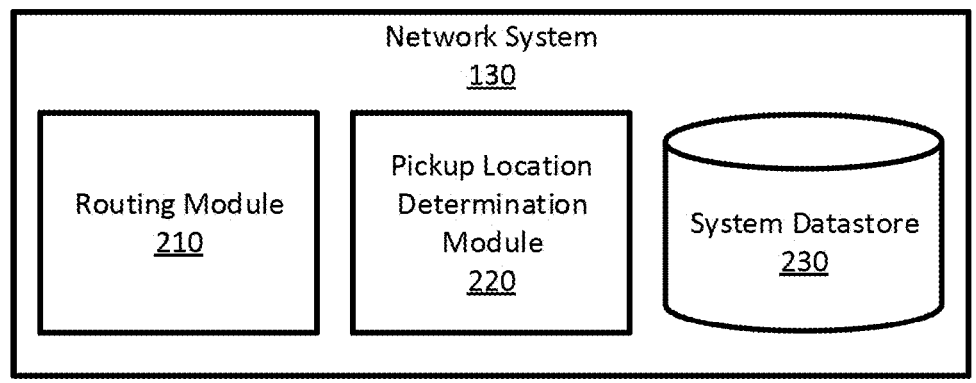
FIG. 2 is an illustration a network system in the system environment, according to one example embodiment.
Figure 3:
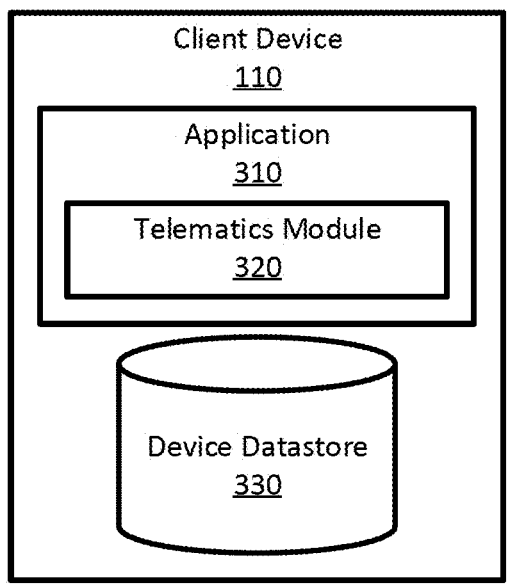
FIG. 3 is an illustration of a client device in the system environment, according to one example embodiment.

FIG. 1 is an example system environment 100 that illustrates client devices 110 and a network system 130 that enable service coordination via a network 120, according to one embodiment. Within the environment 100, network system 130 determines suggested pickup locations for client devices 110 participating in transport service coordination. FIG. 2 gives a more detailed view of modules within network system 130 and FIG. 3 gives a more detailed view of modules within a client device 110 (e.g., service requestor client device 110A and service provider client device 110B), according to some example embodiments. Some embodiments of client devices 110 and network system 130 have different modules than those described herein. Similarly, functionality of the client devices 110 and network system 130 can be distributed among the modules in a different manner than is described herein.

Network system 130 enables service coordination in the environment 100 between client devices 110. Users of network system 130 may include providers that provide a service to other users. In an example use case, a provider operates a transportation vehicle to transport a user from a first location (e.g., pickup location) to a second location (e.g., a destination location). In some cases the transportation vehicle may be autonomous. Other types of service include, for example, delivery of goods (e.g., mail, packages, or consumable items) or services. Although the embodiments herein for facilitating service coordination are described with respect to a transport service, the embodiments herein can be applied to any type of service that requires a service coordination via a network system 130 (e.g., food delivery, shopping, etc.).

As an example, network system 130 enables coordinating transport service between users of client devices 110 within the environment 100. In the context of the description, an operator of a transportation vehicle (i.e., the service provider) provides the service of transporting a person (i.e., the service requestor) to a destination requested by the person. In one embodiment, transportation vehicle includes all vehicles such as cars and motorcycles, as well as public transportation vehicles such as trains, light rail, buses, etc. In some cases, the transportation vehicle can be outfitted with a sensor suite that allows the user of client device 110 to obtain information about the road network, the environment 100, and the operational state of the transportation vehicle as the transportation vehicle traverses the road network.

Further, a client device 110 can correspond to a mobile computing device, such as a smartphone. In some cases, a client device 110 corresponds to an onboard computing system of an autonomous transportation vehicle. Network system 130 can also correspond to a set of servers and can operate with or as part of another system that implements network services. Network system 130 and client devices 110 comprise a number of "modules," which refers to hardware components and/or computational logic for providing the specified functionality. That is, a module can be implemented in hardware, firmware, and/or software (e.g., a hardware server comprising computational logic), other embodiments can include additional modules, can distribute functionality between modules, can attribute functionality to more or fewer modules, can be implemented as a standalone program or as part of a network of programs, and can be loaded into memory executable by processors.

In one embodiment, the transportation of a person from a pickup location to a destination location is referred to as a trip or a transport service. Referring to FIG. 2, routing module 210 of network system 130 calculates a route from the pickup location to the destination location along a set of road segments within the environment 100 based on a historical map of the road segments within the environment 100. In some cases, routing module 210 can calculate a route from the current location of a service provider to a pickup location.

Generally, routing module 210 calculates transaction costs for transport services and coordinates those transport services. A transaction cost is a monetary payment from a service requestor to a service provider in exchange for the service provider transporting the service requestor to a destination location. Routing module 210 may calculate the transaction cost for a transport service based on the distance traveled along the route during the trip (and/or based on a duration of the trip, any applicable tolls, fees, etc.). Routing module 210 determines the distance traveled during the transport service using geographic information (e.g., telematics data) received from client devices (e.g., such as after completion of the transport service). In some examples, other modules within the environment 100 can determine the distance traveled during the transport service. Further, information from other modules may be used in determining transaction costs for a transport service.

Network system 130 receives (e.g., periodically) geographic information from a client device 110 included in a transportation vehicle as the transportation vehicle moves its position. The geographic information includes geographic points that describe a trip of the transportation vehicle. In one embodiment, the geographic information is global positioning system (GPS) information. Throughout the description, geographic information is referred to as telematics data, but the description herein can be applied to any other type of geographic coordinate system.

As shown in FIG. 1, network system 130 is in communication with a service provider client device 110B and the service requestor device 110A via a network(s) 120. In one embodiment, the network 120 is the Internet or any combination of a LAN, a MAN, a WAN, a mobile, wired or wireless network, a private network, or a virtual private network. While only a single service provider client device 110A and a single service requestor device 110A are shown in FIG. 1, any number of client devices 110 can be in communication with network system 130 via the network 120. Further, while described as a service requestor device 110A and a service provider client device 110B, any client device 110 within the environment 100 can include functionality for being a service requestor or a service provider.

FIG. 3 illustrates a client device 110, according to one example embodiment. A client device 110 is an electronic device (e.g., a smartphone) that can interact with network system 130 over the network 120. As described herein, client devices 110 for service requestors and service providers are largely similar in that they can include an application 310 that facilitates transport service. The application 310 includes a telematics module 320 to determine telematics data. The client device 110 may also include a device datastore 330 for storing any relevant information that can facilitate transport service in the environment 100.

When the client device 110 is a service requestor device 110A, the service requestor device 110A is used by a person to request a transport service from a pickup location to a destination location via a client application 310 included in the service requestor device 110A. Application 310 allows the user of the service requestor device 110A to submit a transport service request, which network system 130 then processes in order to select an operator of a transportation vehicle as a transport service provider.

According to some examples, the transport service request may include (i) a user identifier (ID), (ii) a pickup location (e.g., a location identifier specified by the user), (iii) a destination location, (iv) a vehicle type, and/or (v) a requestor location (e.g., a location identifier of the current position of the service requestor device 110A as determined by a telematics module 320 included in the service requestor device 110A and/or input by the service provider). For example, the telematics module 320 uses sensors (e.g., a GPS receiver) included in the service requestor device 110A to determine the requestor location of the service requestor device 110A at various instances in time. The requestor location of the service requestor device 110A may be represented by a location identifier such as latitude and longitude coordinates ("location coordinate"). The requestor location of the service requestor device 110A may also be represented by a location identifier such as an alphanumeric string ("location name"). The location name may be a street address, a building name, a landmark, etc. In some examples, a location name can be determined using the location coordinate. For example, each location coordinate may have a location name(s) associated with the location coordinate in system datastore 230. Thus, application 310 can associate a location coordinate with a location name if the location name is not provided.

The current position of the service requestor device 110A is also associated with a time stamp indicating the time and the date in which the telematics module 320 measured the current position of the service requestor device 110A. In some examples, the pickup location and/or the current location of the service requestor device 110A may be manually inputted into the service requestor device 110A by the user of the device, such as by selecting a location on a map or in the form of an address including at least a street number and street name.

The coordination service, which is implemented by network system 130 and/or other servers or systems, can receive the transport service request over the network 120 and can select a service provider for the requestor. In one example, the coordination service can (i) identify a pool of service providers that are available to provide the requested service and satisfy one or more conditions (e.g., have the specified vehicle type, have sensor system, have a preferred route to the pickup location, and/or are within a predetermined distance or estimated travel time away from the pickup location), (ii) select a service provider from the pool of service providers, and (iii) transmit an assignment request to a service provider client device 110B. The invitation can include the pickup location so that the selected service provider can navigate to the pickup location for initiating the transport service for the requestor. If the selected service provider accepts the assignment request by providing input on the service provider client device 110B, application 310 transmits an assignment acceptance to network system 130. Accepting the assignment can associate the service provider and the service requestor for transport service and network system 130 can notify the service requestor device 110A accordingly.

When the client device 110 is a service provider client device 110B, it is, generally, an electronic device (e.g., a smartphone) operated by a service provider and located within the transportation vehicle used to complete trips. The service provider client device 110B includes a client application 310. The client application 310 displays, on the service provider client device 110B, information about a trip that the service provider has agreed to provide, such as the pickup location, and/or navigation and/or mapping information instructing the service provider to travel to the pickup location. As referred to herein, the pickup location may be the location of the service requestor device 110A, a location specified by the user of the service requestor device 110A, or a pickup location suggested by network system 130. The destination location may be the location the service provider ends transport service, or a location specified by the user of the service requestor device 110A. The client application 310 may also display, on the service provider client device 110B, the destination for the assigned trip if provided by the user of the service requestor client device 110A.

Client devices 110 include a telematics module 320. Telematics module 320 uses one or more sensors of client device 110 to identify telematics data from the service provider client device 110B and the service requestor device 110A. When client application 310 is a transport service coordination application, telematics module 320 can identify GPS data from the client device 110 as the service provider navigates a transportation vehicle along one or more road segments and nodes to complete a trip. The GPS data of the transportation vehicle (or client device 110) represents the transportation vehicle's position at different instances in time during a trip. For example, at time $T_1$, client device 110 can be at a particular GPS location, identified by a location identifier (e.g., latitude and longitude coordinates) and a time stamp indicative of the time and date when client device 110 measured its current position. If the transportation vehicle is moving, at time $T_2$ client device 110 can be at a different GPS location. In this manner, client device 110 periodically measures the current position of the transportation vehicle (e.g., every three seconds, every four seconds, etc.) and periodically provides GPS data that is representative of the position of the transportation vehicle over time to network system 130. Alternatively, client device 110 may provide GPS data whenever new or updated measurements of the current position of the transportation vehicle are taken or are available.

Referring again to FIG. 2, network system 130 includes a pickup location determination module ("PLD") 220. PLD module 220 determines a suggested pickup location for a service requestor. In many cases, the suggested pickup location is a coordinate on or adjacent to a road segment, but may be any other location. PLD module 220 inputs a transport service request and outputs a suggested pickup location for the transport service. PLD module 220 can determine a suggested pickup location for several reasons, such as, for example, (i) the requestor location is not near a road segment, (ii) the requestor location is not near an easily accessible road segment, and/or (iii) the transport service request does not include a pickup location.

PLD module 220 includes functionality to facilitate network system 130 determining a suggested pickup location. For example, PLD module 220 can access information describing a road segment from system datastore 230. Generally, the information may include a starting coordinate for the road segment, an ending coordinate for the road segment, locations of any saved pickup locations located along the road segment, and/or a location name for the road segment. Additionally, the information may include a road segment type. Each road segment type can be classified as navigable or un-navigable. Navigable road types are road types that allow for a service provider to easily pick up a service requestor at a pickup location on that road segment (e.g., a road segment that allows for safe stopping of a transportation vehicle). Unnavigable road types are road types that do not allow for a service provider to easily pick up a service requestor at a pickup location on that road segment. Some road types that are unnavigable include, for example, a controlled access road, a ferry, a bridge, a ramp, a tunnel, an HOV road, an intersection, or a roundabout.

PLD module 220 can determine road segments near the requestor location ("nearby road segments"). Nearby road segments are road segments within a threshold distance from the location coordinate of a requestor location. To illustrate, PLD module 220 accesses road segments within 500 m from the location coordinate from system datastore 230. In other examples, PLD module 220 could use any other threshold distance. In various configurations, the threshold distance is predetermined (e.g., stored in system datastore 230), while in other examples the threshold distance dynamically determined based on the density of road segments near the requestor location. For example, if the location coordinate is in a busy downtown area with a large number of road segments, PLD module 220 may determine a threshold distance that is lower than a threshold distance if the requestor location is in a suburban neighborhood. To illustrate, PLD module 220 accesses a number of pickup locations that are nearest a requestor location coordinate from system datastore 230. Here, PLD module 220 accesses 30 pickup locations nearest a requestor location coordinate, but could access any other number of pickup locations. Similarly, in some examples, the number of nearby pickup locations may be predetermined. That is, PLD module may access, for example, the 30 nearest road segments. In other examples, the number of nearby road segments PLD module 220 accesses is dynamically determined based on a density of nearby road segments as previously described.

PLD module 220 can determine navigable road segments. Navigable road segments are road segments which have a navigable road type. To determine if a road segment is navigable, PLD module 220 access the road type of the road segment from system datastore 230. Once accessed, PLD module 220 determines a road segment is a navigable road segment if the road segment has a navigable road type, and, conversely, PLD module 220 determines a road segment is a non-navigable road segment if the road segment has a non-navigable road type.

PLD module 220 can determine addressed matched road segments. Address matched road segments are road segments whose location name is the same, or highly similar to, the location name for the requestor location. As one example, PLD module 220 accesses a location name for a road segment from system datastore 230. PLD module 220 compares the accessed location name to the location name of a requestor location. PLD module 220 determines that a road segments with a location name similar to the location name for the requestor location are addressed matched pickup locations. Comparison of the location name of accessed road segments and the location name of the requestor location can use an address matching filter. An embodiment of an address matching filter is described in the Section titled "Determining Addressed Matched Pickup Locations."

PLD module 220 can determine accessible road segments. Accessible road segments are road segments that have, for example, zero or one edge crossing. An edge crossing is a representation of when a service requestor may have to traverse a road segment in a road network to reach a suggested pickup location. To determine accessible road segments, PLD module 220 accesses a set of contiguous road segments immediately surrounding the requestor location and generates a bounding box. All road segments external the bounding box are non-accessible road segments and all road segments internal the bounding box are accessible road segments. Additionally PLD module 220 determines a number of edge crossings for each road segment internal the bounding box to determine accessible road segments. To do so, PLD module 220 generates an edge and a path for each road segment. An edge is a polyline between a starting location and an ending location for the road segment. A path is a polyline (or polylines, or range) connecting the requestor location to a coordinate (or coordinates) on the edge. The coordinate may be at the midpoint, starting location, ending location, or at any other location(s) along the edge. PLD module 220 determines a number of edge crossings for each road segment using the generated edges and paths. Generally, an edge crossing occurs when an edge and a path intersect and/or overlap. In one configuration, PLD module 220 determines a road segment having one or fewer edge crossings is an accessible road segment. Determining edge crossings is described in more detail in the Section titled "Determining Accessible Pickup Locations."

PLD module 220 can determines a suggested pickup location. A suggested pickup location is a coordinate that may be used as a pickup location for the transport service. Generally, a suggested pickup location is a coordinate on a road segment that fulfills a criteria. For example, a criteria may be that pickup location is located on a road segment that is a nearby road segment, an address matched road segment, a navigable road segment, and an accessible road segment. Other criteria may use other combinations road segment types.

PLD module 220 may select a single suggested pickup location. For example, PLD module 220 can select a road segment nearest the requestor location as a suggested road segment. PLD module 220 determines a coordinate on (or adjacent to) the suggested road segment as the suggested pickup location. In one example, PLD module 220 determines that the midpoint of the suggested road segment is the suggested pickup location. In another example, PLD module 220 determines that the coordinate on the suggested road segment nearest the requestor location is the suggested pickup location. In still another example, PLD module 220 determines that the coordinate on the suggested road segment with a shortest walking distance to the requestor location is the suggested pickup location. In another example, PLD module 220 can select a pickup location that was previously determined for the suggested road segment as the suggested pickup location.

PLD module 220 may suggest more than one pickup location. For example, PLD module 220 may transmit a pickup location for all road segments that meet the criteria to the service requestor client device 110A such that the service requestor may select an appropriate pickup location. In another example, PLD module may suggest multiple pickup locations on the same suggested road segments such that the service requestor may select an appropriate pickup location.

In some configurations, PLD module 220 can rank the pickup locations according to a ranking function. The ranking function can rank pickup locations based on a variety of criteria including, for example, how often the pickup location is selected, absolute distance from the requestor location, walking distance from the requestor location, travel time to the pickup location, transport service demand at the pickup locations, etc.

III. Determining a Suggested Pickup Location

Figure 4:
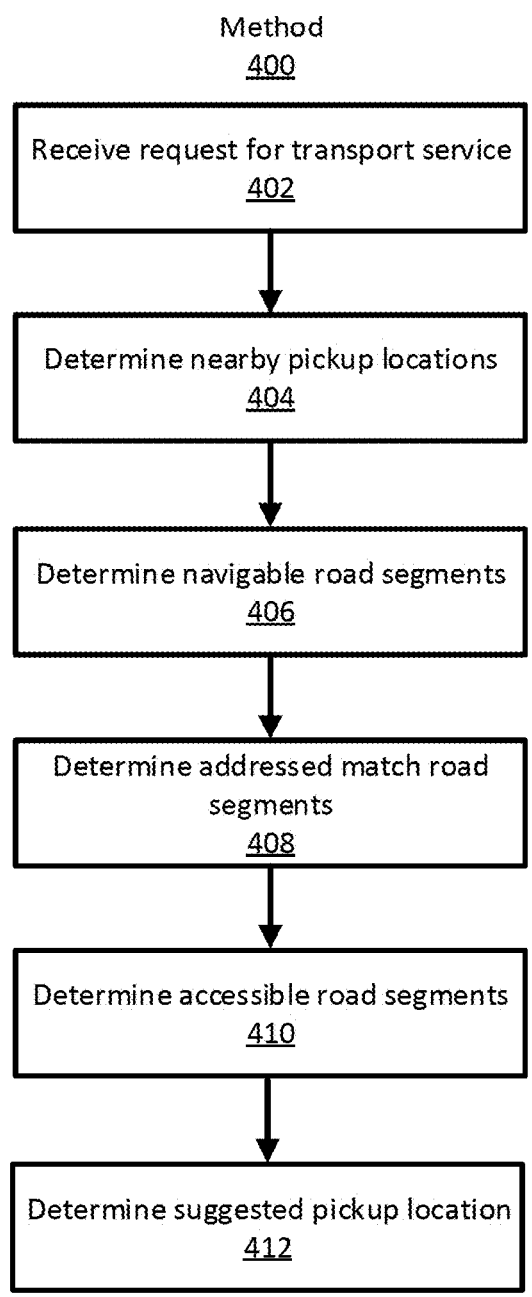
FIG. 4 is a flow diagram illustrating a method for determining a suggested pickup location, according to one example embodiment.

FIG. 4 is an illustration of a process flow for a method 400 to determine a suggested pickup location for a transport service, according to one example embodiment. In various embodiments, method 400 can include additional or fewer steps or the steps may be accomplished in other orders. In various embodiments, method 400 can repeat any of the steps, or any series of steps, at any time. Method 400 will be described in reference to FIG. 5A-5F.

To begin, a service requestor initializes application 310 on a service requestor client device 110A in an environment 100. A service provider initializes application 310 on a service provider client device 110B in the environment 100. In this example, the service provider and service requestor use client devices 110 and network system 130 to coordinate transport service in the environment 100. The service provider operates a transportation vehicle and provides transport service to the service requestor.

The service requestor client device 110A requests transport service from a requestor location to a destination location. The requestor location may include a location name and/or a location coordinate. The drop-off location may similarly include a location name and/or a location coordinate. The service requestor client device 110B transmits a transport service request including the requestor location to network system 130 via network 120.

Figure 5A:
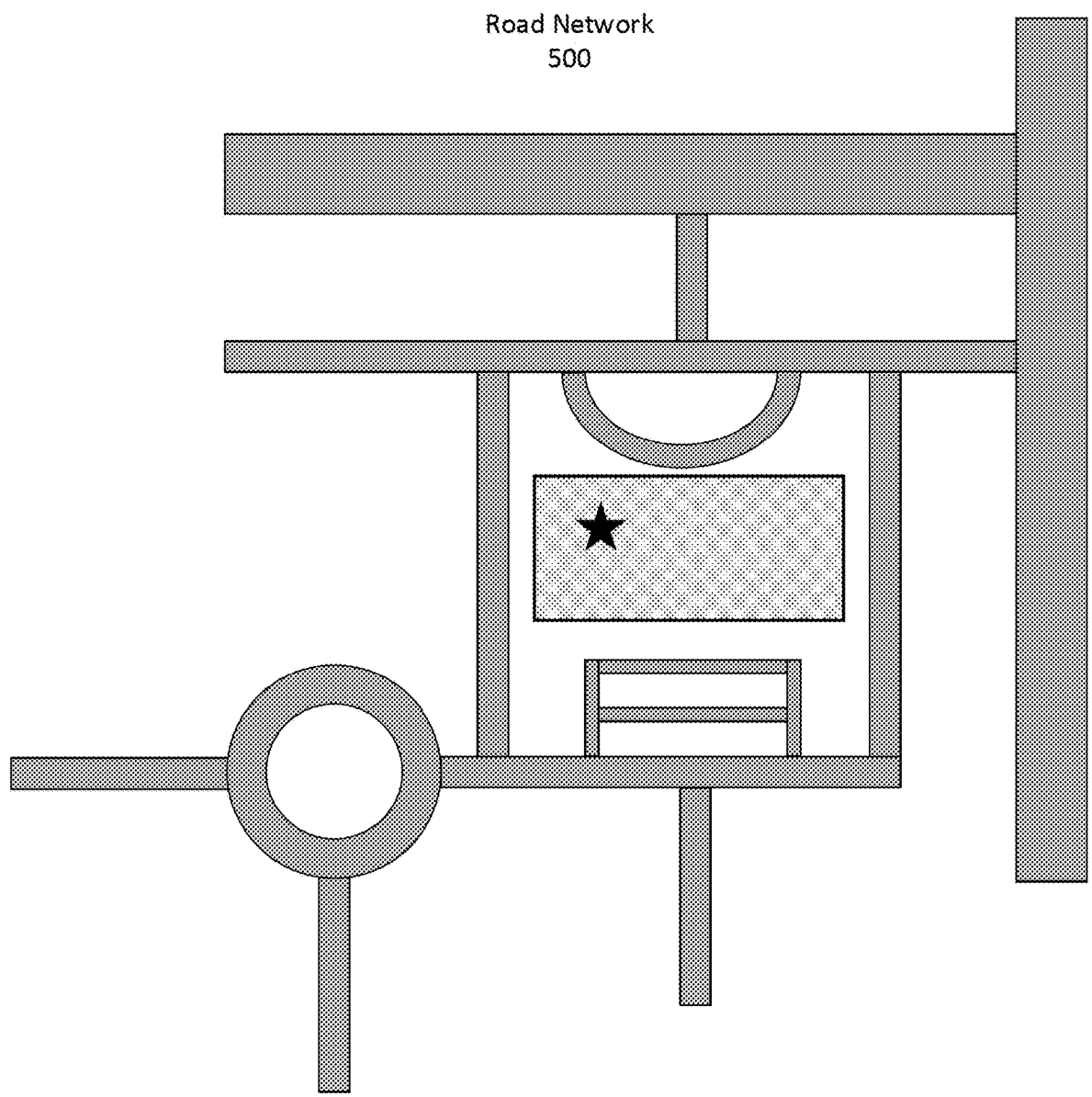
FIG. 5A is an illustration of a road network including a requestor location, according to one example embodiment.

FIG. 5A illustrates a requestor location in an environment, according to one example embodiment. In this example, the environment includes a road network 500 and each road 502 in the road network 500 is illustrated as a grey line. A building 504 in the road network 500 is illustrated as a patterned box. Each road 502 in road network 500 is represented as one or more road segments in system datastore 230. Here, the requestor location 510 is the location of a service requestor client device 110A that transmits a transport service request to network system 130 via network 120. Requestor location 510 is within building 504 and is illustrated as a black star. Requestor location 510 includes a location name and a location coordinate. In this example, the location coordinate is the GPS coordinate obtained by telematics module 320 of service requestor client device 110A within building 504. The location name is the street address of building 504 which is associated with the location coordinate in system datastore 230.

Returning to FIG. 4, network system 130 receives 402 the transport service request from the service requestor client device 110A via the network 120. Generally, routing module 210 generates a route from the requestor location (e.g., requestor location 510) to the drop-off location. However, here, the requestor location is not currently located near a road segment and/or pickup location stored in system datastore 230. Accordingly, PLD module 220 determines a suggested pickup location for the service requestor.

To determine a suggested pickup location, PLD module 220 determines 404 a set of nearby road segments near the requestor location 510. In this example, PLD module 220 accesses road segments within 500 m of the location coordinate from system datastore 230. In this case, the threshold distance is predetermined and stored in system datastore 230. PLD module 220 determines that all the pickup locations that are nearer the requestor location than the threshold distance are nearby pickup locations. In various examples, PLD module 220 can consider a road segment with a partial amount of the road segment (e.g., 0.01, 1%, 100%, etc.) nearer the requestor location than the threshold distance a nearby road segment.

Figure 5B:
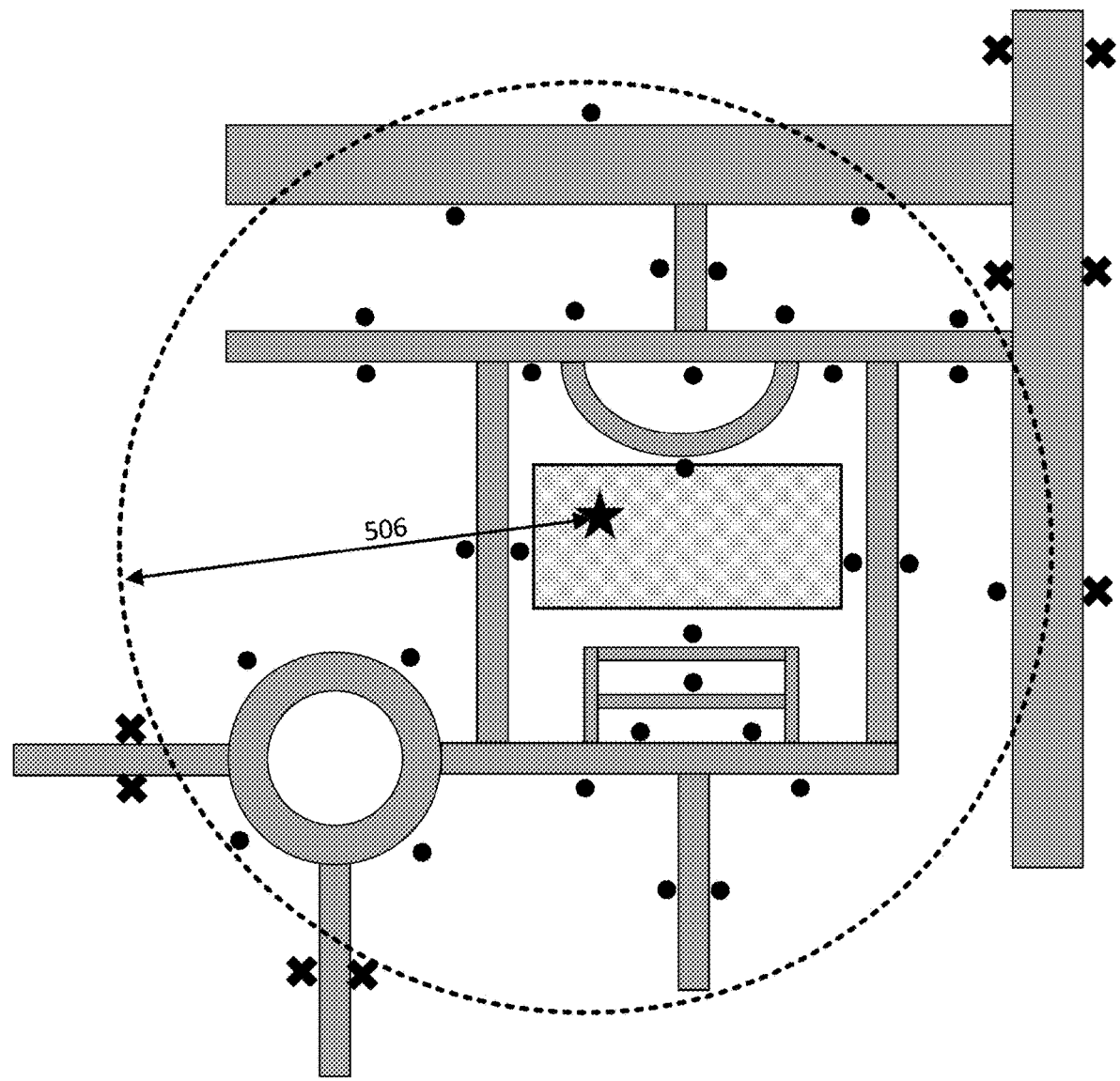
FIG. 5B is an illustration of a road network including nearby road segments, according to one example embodiment.

FIG. 5B illustrates a set of nearby road segments, according to one example embodiment. FIG. 5B illustrates the same road network 500 and requestor location 510 as FIG. 5A. In FIGS. 5B-5F each road segment is illustrated as a pickup location. The pickup location is illustrated at the midpoint of the road segment, but could be at any other location on the road segment. In FIG. 5B, nearby pickup locations 512 are illustrated with a "•" and non-nearby pickup locations are illustrated with a "×". Thus, nearby pickup locations are located on nearby road segments and non-nearby pickup locations are located on non-nearby road segments.

In FIG. 5B the threshold distance 506 is illustrated as a black line. Also illustrated is a dashed line circle with the requestor location 510 at its center. In the context of FIG. 5B, the area within the circle is nearer the requestor location 510 than the threshold distance 506 and the area outside the circle is further away from the requestor location 510 than the threshold distance 506. Thus, all road segments within the circle are nearer the requestor location 510 than the threshold distance 508. Accordingly, all pickup locations within the circle are nearby pickup locations 512 and all pickup locations outside the circle are non-nearby pickup locations 514.

Returning to FIG. 4, PLD module 220 determines 406 a set of navigable road segments from the set of nearby road segments. PLD module 220 access the road type of each nearby road segment. Once accessed, PLD module 220 determines a road segment is a navigable pickup location if the road segment has a navigable road type, and, conversely, PLD module 220 determines a road segment is a non-navigable road segment if the road segment has a non-navigable road type.

Figure 5C:
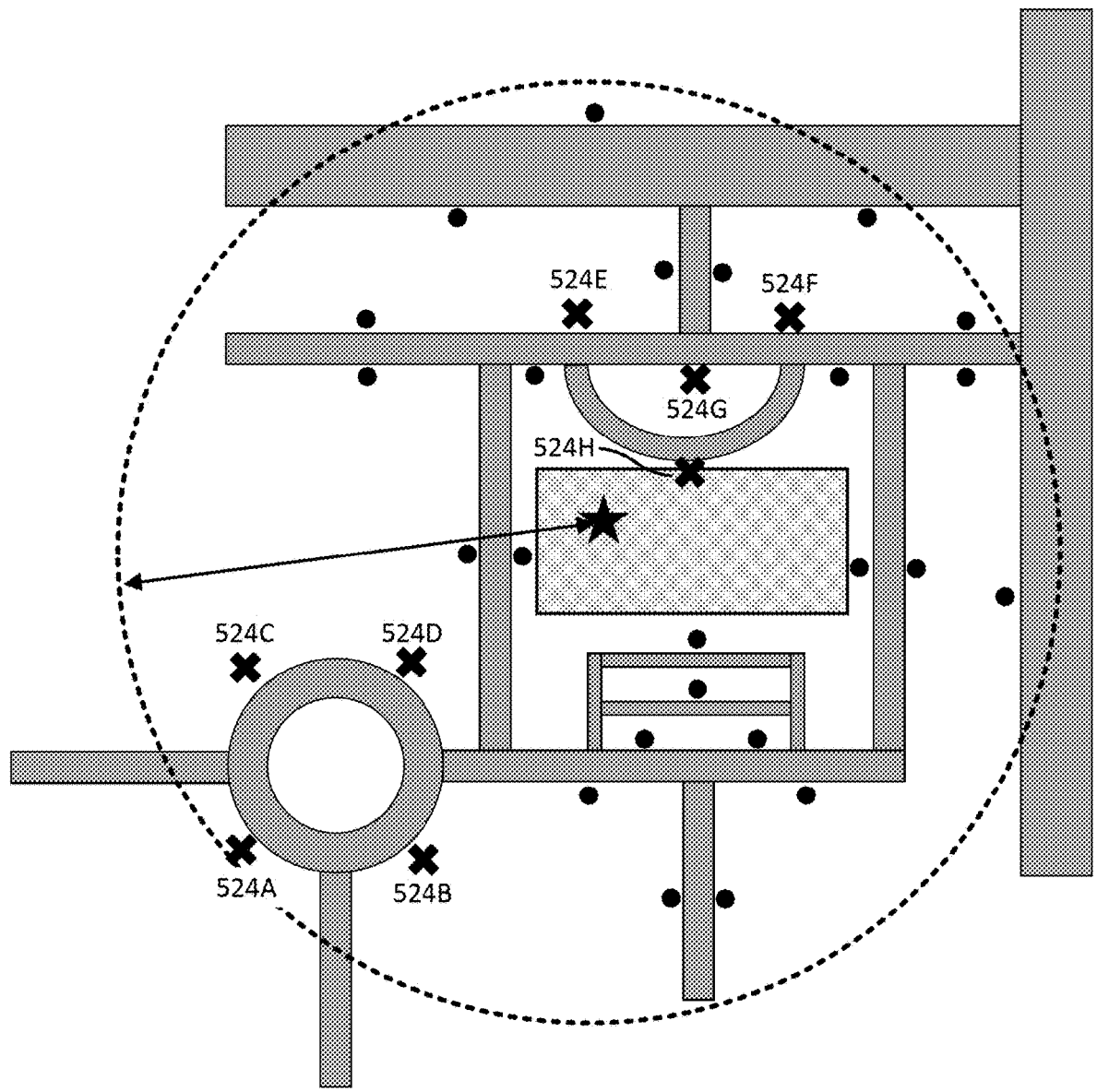
FIG. 5C is an illustration of a road network including navigable road segments, according to one example embodiment.

For example, FIG. 5C illustrates a set of navigable road segments, according to one example embodiment. FIG. 5C illustrates the same road network 500 and requestor location 510 as FIG. 5B. In FIG. 5C, only pickup locations that were previously determined to be nearby pickup locations are illustrated. Further, navigable pickup locations are illustrated with a "•" and non-navigable pickup locations are illustrated with a "×". Thus, navigable pickup locations are located on navigable road segments and non-navigable pickup locations are located on non-navigable road segments.

In the example of FIG. 5C, some of the nearby road segments are non-navigable road segments because the road segments are an unnavigable road type. For example, pickup locations 524A-D are non-navigable pickup locations because they are located on a road segment that with a roundabout road type; pickup locations 524E-G are non-navigable pickup locations because they are located on a road segment with an intersection road type; and pickup location 524H is a non-navigable pickup location because they are on a road segment with a controlled access road type. All of the remaining pickup locations in FIG. 5C are navigable pickup locations 522 because they are located on a road segment with a navigable road type.

Returning to FIG. 4, PLD module 220 determines 408 a set of addressed matched road segments from the set of navigable road segments. PLD module 220 accesses the location name for each road segment from system datastore 230 and compares the accessed location name to the location name of the requestor location. PLD module 220 applies an address matching filter to determine address matched road segments. As an example, PLD module 220 determines that the alphanumeric strings "15 E Market Street" and "15 Market Street" are similar because the alphanumeric edit distance is 1. Similarly, PLD module 220 determines that the alphanumeric strings "19 Market Street" and "18 Market Street" are dissimilar because the numeric edit distance is 1. In this example, the former road segment is an addressed matched road segment while the latter road segment is a non-address matched road segment.

Figure 5D:
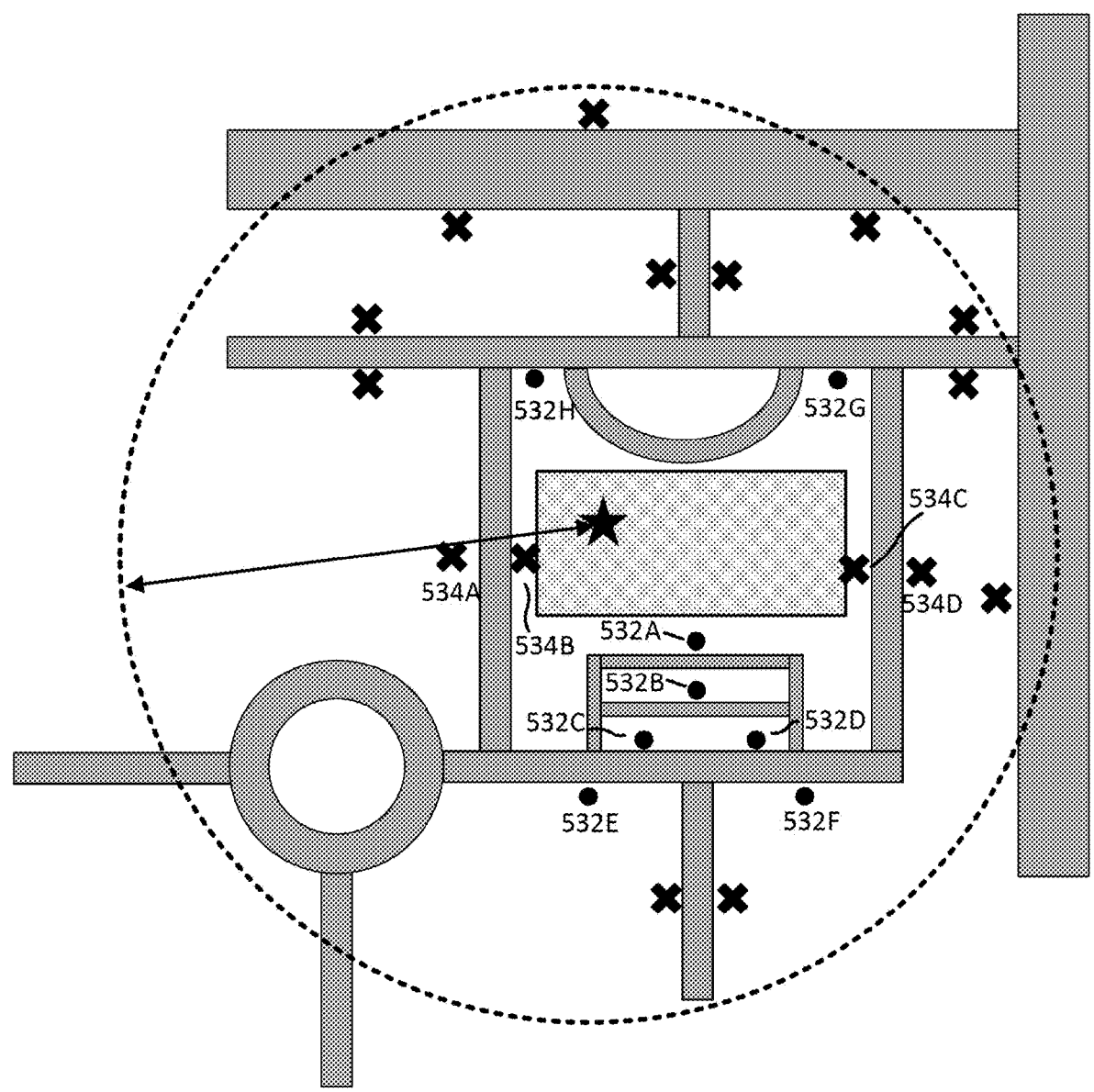
FIG. 5D is an illustration of a road network including address matched road segments, according to one example embodiment.

For example, FIG. 5D illustrates a set of addressed matched road segments, according to one example embodiment. FIG. 5D illustrates the same road network 500 and requestor location 510 as FIG. 5C. In FIG. 5D, only pickup locations that were previously determined to be navigable pickup locations are illustrated. In FIG. 5D, address matched pickup locations are illustrated with a "•" and non-address matched pickup locations are illustrated with a "×". Thus, address matched pickup locations are located on address matched road segments and non-address matched pickup locations are located on non-address matched road segments.

In this example, network system 130 determines a location name for the requestor location 510 based on the location coordinate. More specifically, here, the location coordinate is [39.4927 N, 123.2134 W] as determined by a service requestor client device 110A at the requestor location 510. Network system 130 determines that a building 504 with location name "Brownstone Performance Arena" ("BPA") includes the location coordinate. Further, network system 130 determines that the road segments associated with the BPA have a location name "88 S Uri Street". As such, PLD module 220 determines that the location name for the requestor location 510 is "88 S Uri Street". PLD module 220 compares the location names of all navigable road segments to the location name of requestor location 510.

For brevity, only a few of the location names for navigable road segments will be described in detail. In FIG. 5D, pickup locations 534A and 534B are on a road segment with location name "100 E Uri Street"; pickup locations 534C and 534D are on a road segment with location name "100 W Uri Street"; pickup locations 532A-532F are on a road segment with location name "88 S Uri Street"; and pickup locations 532G and 532H are on a road segment with location name "88 N Uri Street." PLD module 220 determines that road segments with pickup locations 534A-D are non-addressed matched road segments because the location names of the road segments are not addressed matched to the location name of requestor location 510. In particular, the road segments with pickup locations 534A-D are non-address matched pickup locations because their numeric edit distance is greater than 0. PLD module 220 determines that road segments having pickup locations 532A-H are address matched road segments because the location names are address matched to the location name of requestor location 510. All of the additional illustrated pickup locations that are not described in detail are pickup locations for non-address matched road segments.

Returning to FIG. 4, PLD module 220 determines 410 a set of accessible road segments from the set of address matched road segments. PLD module 220 accesses the road segments immediately surrounding the requestor location and generates a bounding box representing those road segments. All road segments external the bounding box are non-accessible road segments and all pickup locations internal the bounding box are accessible road segments.

PLD module 220 determines a number of edge crossings for each road segment internal the bounding box to determine accessible road segments. PLD module 220 generates an edge and a path for each road segment internal the bounding box. PLD module determines a number of edge crossings for each road segment using the edges and paths. PLD module 220 determines that a road segment having one or fewer edge crossings is an accessible road segment.

Figure 5E:
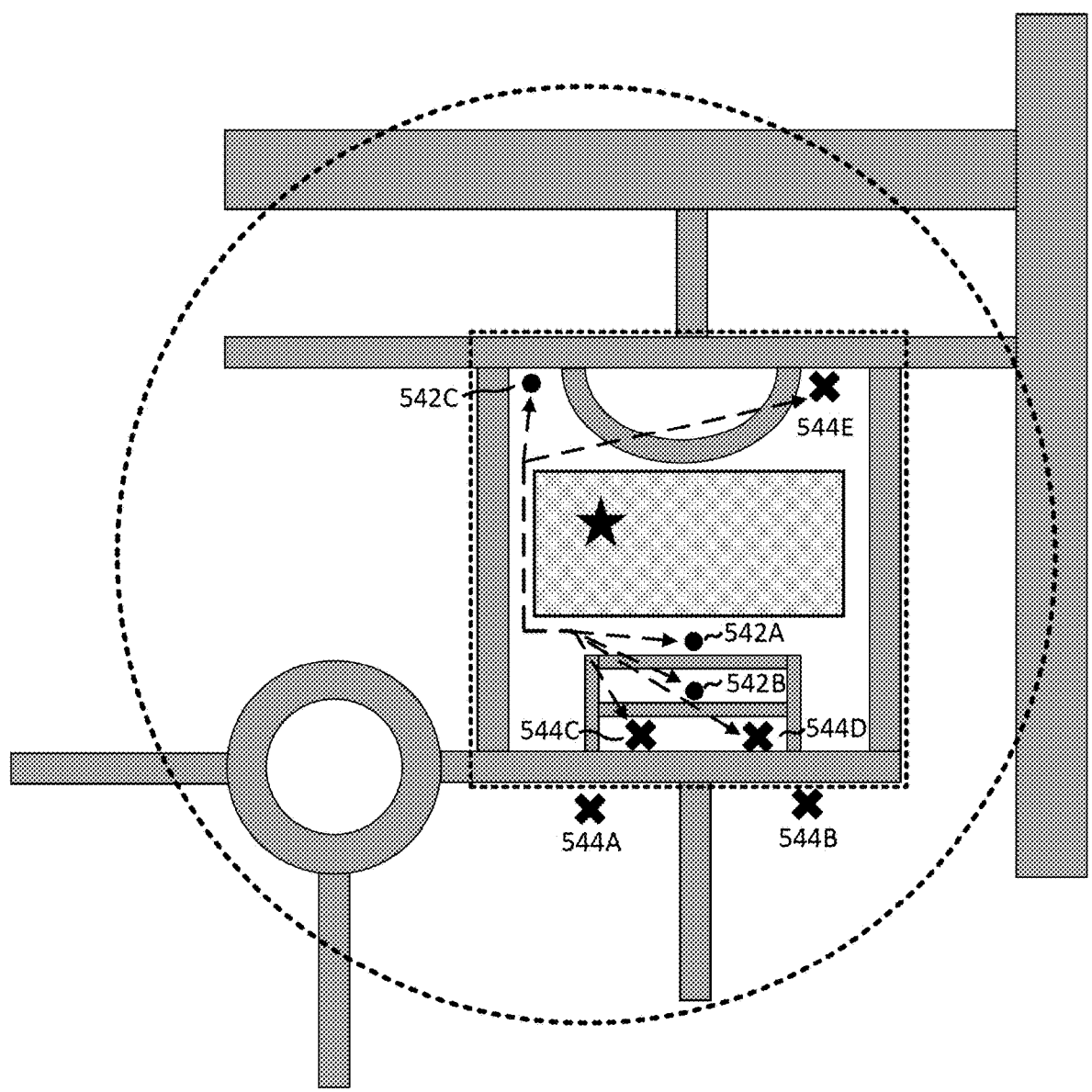
FIG. 5E is an illustration of a road network including accessible road segments, according to one example embodiment.

For example, FIG. 5E illustrates a set of accessible road segments, according to one example embodiment. FIG. 5E illustrates the same road network 500 and requestor location 510 as FIG. 5D. In FIG. 5E, only pickup locations that were previously determined to be address matched pickup locations are illustrated. In FIG. 5E, pickup locations that are accessible pickup locations are illustrated with a "•" and non-accessible pickup locations are illustrated with a "×". Thus, accessible pickup locations are located on accessible road segments and non-accessible pickup locations are located on non-accessible road segments.

In the example of FIG. 5E, a bounding box determined by PLD module 220 is illustrated as a dashed line square. Pickup locations 544A and 544B are inaccessible pickup locations because they are outside of the bounding box.

FIG. 5E also illustrates paths 508 and edges for the road segments internal to the bounding box. While not shown directly, the edges may be visualized as the roads 502 in the road network 500. Paths are illustrated as a dashed arrow. The path for each pickup locations is from a point outside of the building 504 because the PLD module 220 is aware the requestor location is internal the building 504 and the point is the entrance and/or exit to the building 504. Further, some paths 508 are not straight lines and reflect the likely walking path for the service requestor from the requestor location 510 to the respective road segment. In the illustrated example, pickup locations 544C-544D are inaccessible because they have two edge crossings and pickup locations 542A-C are accessible pickup locations because they have one or fewer edge crossings. Other examples of determining edge crossings are possible and are described in Section V.

Returning to FIG. 4, the PLD module 220 determines 412 a suggested pickup location from the accessible road segments. In this example PLD module 220 determines the suggested road segment is the road segment having the shortest path. The PLD module determines a coordinate for the suggested pickup location that is the midpoint of the road segment.

Figure 5F:
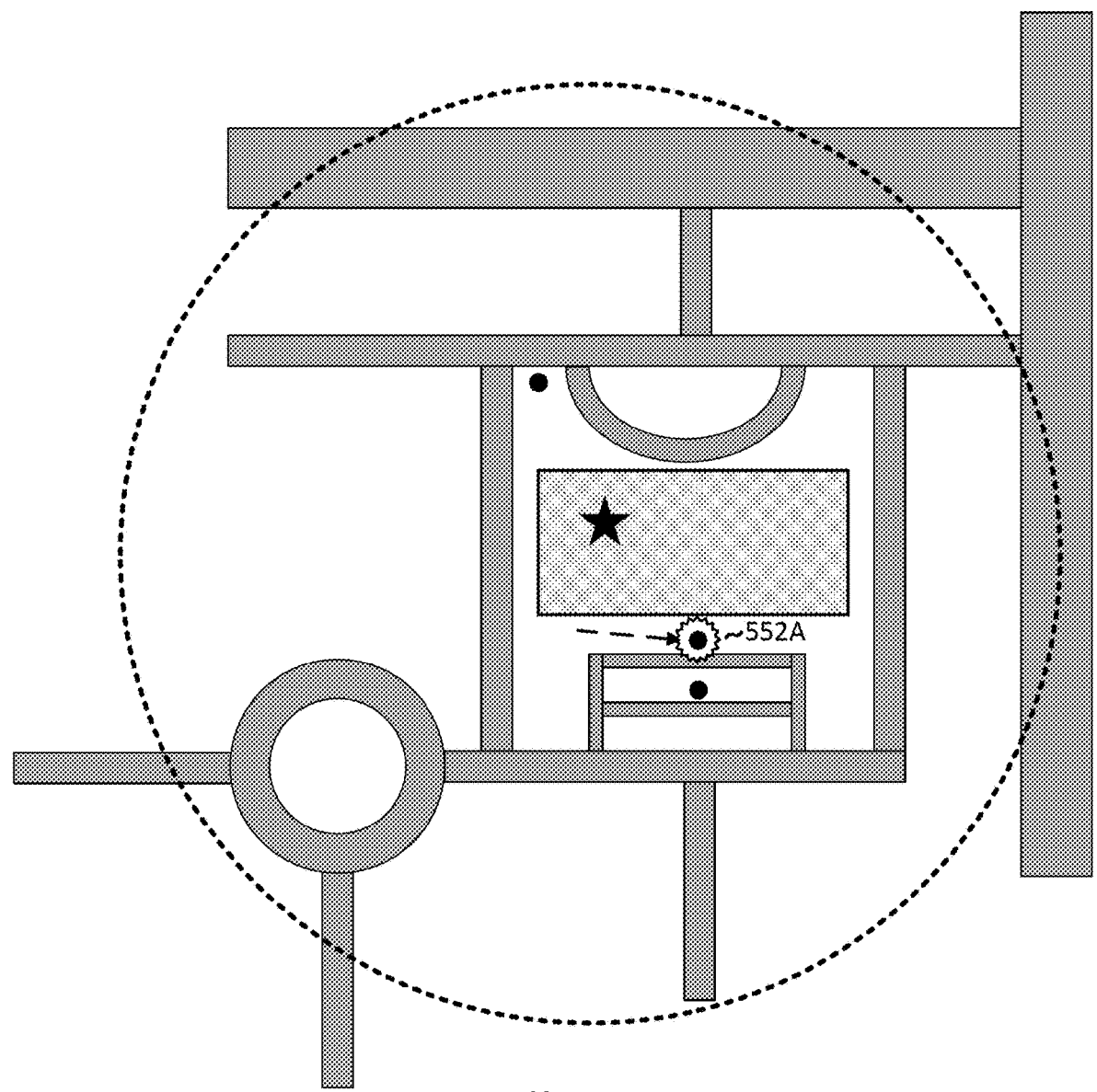
FIG. 5F is an illustration of a road network including a suggested pickup location, according to one example embodiment.

For example, FIG. 5F illustrates a suggested pickup location, according to one example embodiment. FIG. 5F illustrates the same road network 500 and requestor location as FIG. 5E. In FIG. 5F, only pickup locations that were previously determined to be accessible pickup locations are illustrated. In the example of FIG. 5F the suggested pickup location 552A is illustrated inside of a burst symbol. In FIG. 5F PLD module 220 determines pickup location 552A is the suggested pickup location because the path 508 for the road segment where that pickup location is located is the shortest. That is, the walking distance from the front of the building 504 to the road segment where the pickup location is located is the shortest when compared to the paths of other accessible road segments.

Returning to method 400 of FIG. 4, once PLD module 220 determines a suggested pickup location, network system 130 sends the suggested pickup location to service requestor client device 110A. The service requestor interacts with the service requestor client device 110A and may select the suggested pickup location as the pickup location for the transport service. Alternatively, the service requestor may select a different pickup location.

Service requestor client device 110A transmits the selected pickup location to the network system 130. Network system 130 determines a route from the selected pickup location to the destination location for the transport service. Network system 130 assigns the transport service to a service provider in the environment and transmits the route to the service provider client device 110B. The service provider provides transport service for the service requestor from the selected pickup location to the drop-off location using a transportation vehicle.

Additionally, method 400 can act as a filtering process. That is, for each step of method 400 determining a set of road segments (e.g., steps 404, 406, 408, and 410) only road segments meeting the criteria for that step are passed to the next step. In this manner, step 412 may only determine a suggested pickup location from road segments that meet the criteria of all previous filtering steps.

IV. Determining Addressed Matched Pickup Locations

Figure 6:
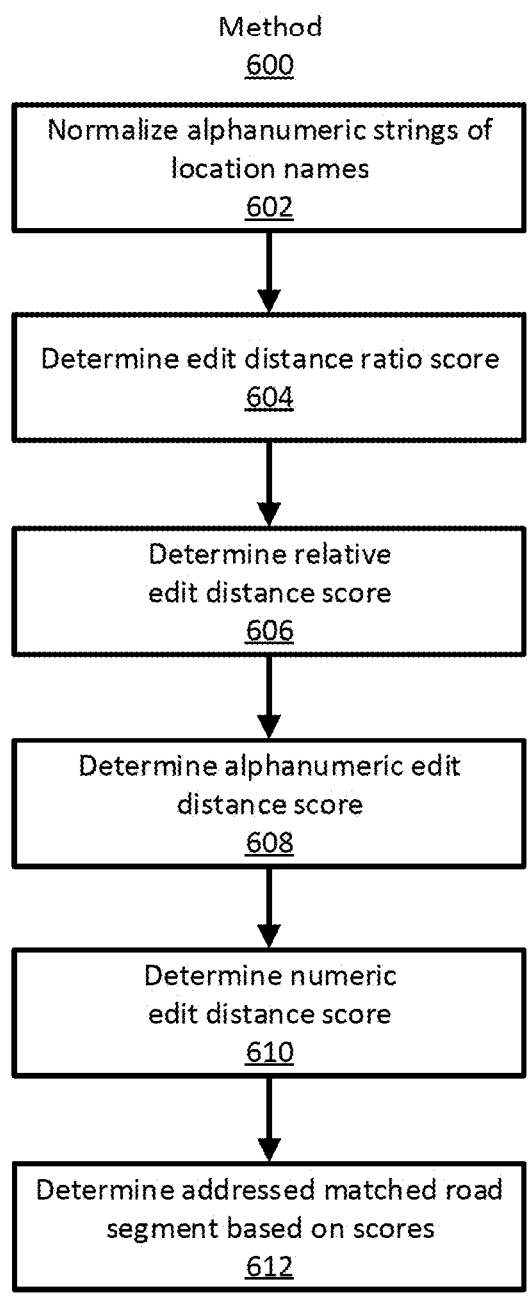
FIG. 6 is a flow diagram illustrating a method for determining address matched road segments, according to one example embodiment.

FIG. 6 is an illustration of a process flow for a method 600 to determine addressed matched road segments using an address matching filter (e.g., step 408 of method 400), according to one example embodiment. In various embodiments, method 600 can include additional or fewer steps or the steps may be accomplished in other orders. In various embodiments, method 600 can repeat any of the steps, or any series of steps, at any time. Broadly, the address matching filter determines an edit distance ratio score, a relative edit distance score, an alphanumeric edit distance score, and/or a numeric edit distance score to determine address matched road segments.

PLD module 220 inputs a set of road segments (e.g., navigable road segments) and outputs a set of address matched road segments. Address matched road segments are road segments whose location name ("segment location name") matches the location name of the requestor location ("requestor location name"). The segment location name and/or the requestor location name can be accessed from system datastore 230. The location names may be a street address, a building name, a landmark, etc. However, more generally, a location name and/or is any alphanumeric string that describes the location in the environment.

PLD module 220 normalizes 602 the requestor location name and the segment location name. Normalizing the location names allows PLD module 220 to more easily compare alphanumeric strings to determine address matched road segments. Normalizing location names may include transforming address tokens in the alphanumeric strings. A token is a portion of an alphanumeric string that is commonly used in describing a location and may be abbreviated. For example, PLD module 220 may normalize the word (i.e., token) "Street" to "St", the word "East" to "E", the words "North West" to "NW", etc. Many other address tokens may be normalized. Additionally, normalizing the location names may include removing special characters from the alphanumeric strings. For example, the PLD module 220 may remove characters such as "@", "*", "!", and " ☺ ". Further, normalizing the location names may include lower casing all of the characters in the alphanumeric strings. For example, PLD module 220 may modify the alphanumeric string "33 Whisper Avenue" to "33 whisper avenue".

PLD module 220 determines 604 an edit distance ratio score for each road segment to determine address matched road segments. An edit distance ratio score is a quantification of an amount of textual mismatch in the alphanumeric strings of the location names and the combined textual length of the alphanumeric strings. More particularly, the edit distance ratio score is the text-based edit distance between the segment location name and the requestor location name divided by the summed length of the text characters in the alphanumeric strings of the segment location name and requestor location name. The edit distance is a quantification of how dissimilar two alphanumeric strings are to one another by counting the minimum number of operations required to transform one string to another string. In various examples, the edit distance can measure both the textual (alpha) and/or numeric edit distances between two strings.

For example, PLD module 220 accesses a normalized segment location name "12 urrie st" and a normalized requestor location name "12 uri st". Here, the text-based edit distance is 2 because a deletion of the characters "r" and "e" make the alphanumeric strings of the segment location name and requestor location name identical. In this example, the combined number of text characters in the alphanumeric string is 15. Therefore, the edit distance ratio score is 0.13. In some configurations, PLD module 220 determines road segments that have an edit distance ratio score below a threshold value are address matched road segments. In one example, the threshold value may be 0.4, but may be any other suitable value.

PLD module 220 determines 606 a relative edit distance score for each road segment to determine address matched road segments. A relative edit distance score is a quantification of an amount of textual mismatch for a particular segment location name and the requestor location name relative to textual mismatch of other input segment location names and the requestor location name. More particularly, the relative edit distance is the difference between the edit distance of a particular road segment and the edit distance of the input road segment with the lowest edit distance. For example, a set of five input road segments A, B, C, D, and E, have edit distances of 1, 2, 1, 4, and 3, respectively. The relative edit distance score for road segments A and C is 0 because 1 is the lowest edit distance. The relative edit distances for B, C, and E, respectively, are 1, 3, and 2, because that is the difference between their edit distance and the lowest edit distance (e.g., 1). In some configurations, PLD module 220 selects road segments have a relative edit distance score below a threshold value as address matched road segments. In one example, the threshold value may be 0, but may be any other suitable value.

PLD module 220 determines 608 an alphanumeric edit distance score for each input road segment to determine address matched road segments. An alphanumeric edit distance score is a quantification of an absolute amount of mismatch between the alphanumeric strings of a segment location name and a requestor location name. More particularly, an alphanumeric edit distance score is a sum of the numeric edit distance and textual edit distance between the segment location name and requestor location name. For example, PLD module 220 accesses a normalized segment location name "881 whisper av" and a normalized requestor location name "882 whysper av". The alphanumeric edit distance score is 2 because replacing the digit "2" with "1" and the character "y" with "i" makes the alphanumeric strings the same. In some configurations, PLD module 220 determines road segments that have an alphanumeric edit distance score below a threshold value as addressed matched road segments. In one example, the threshold value may be 4, but may be any other suitable value.

PLD module 220 determines 610 a numeric edit distance score for each input road segment to determine address matched road segments. A numeric edit distance score is a quantification of an amount of mismatch between the numeric characters in the alphanumeric strings of a road segment and a requestor location. For example, PLD module 220 accesses a normalized segment location name "131 nw vader rd" and a normalized requestor location name "144 nw vader rd". The numeric edit distance score is 2 because replacing the digit "4" with "3" and the digit "4" with "1" makes the numeric characters of the segment location name and requestor location name the same. In some configurations, PLD module 220 selects road segments that have a numeric edit distance score below at or below a threshold value as address matched road segments. In one example, the threshold value may be 0, but may be any other suitable value.

PLD module 220 determines 612 addressed matched road segments based on any number of the determined scores. For example, addressed match road segments may be road segments with an edit distance ratio score below 0.4, a relative edit distance score at 0.0, an alphanumeric edit distance score below 4.0, and a numeric edit distance score at 0.0. Any other combination of scores is also possible. In some configurations, the PLD module 220 may use a weighting function to determine addressed matched road segments. For example, the weighting function may favor the numeric edit distance score over the edit distance ratio score when determining address matched road segments. Additionally, method 600 can act as a filtering process. That is, for each step of method 600 determining a score (e.g., steps 604, 606, 608, and 610) only road segments below the threshold score are scored in the next step. In this manner, step 612 may only determine addressed matched road segments of the remaining input road segments.

V. Determining Accessible Pickup Locations

Figure 7:
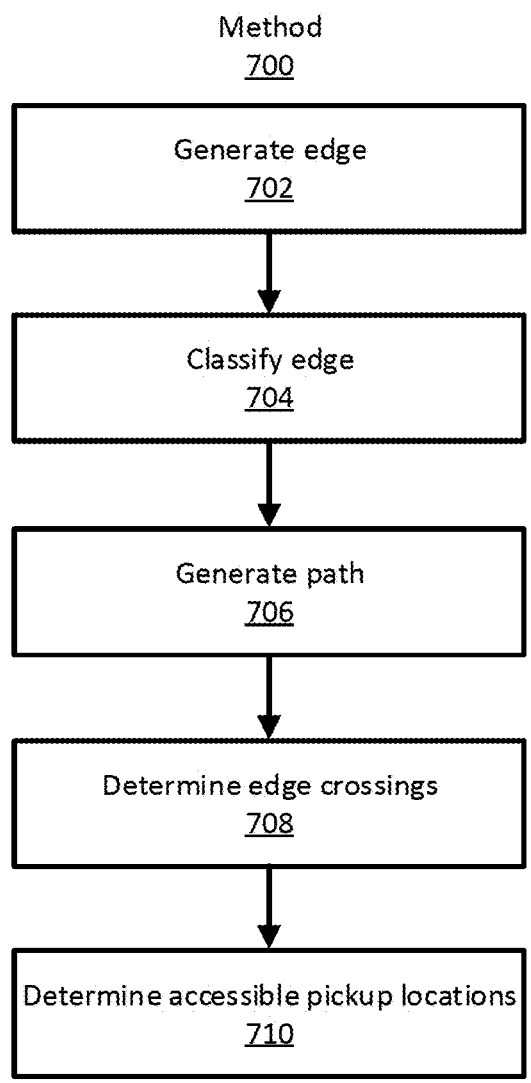
FIG. 7 is a flow diagram illustrating a method for determining accessible road segments, according to one example embodiment.

FIG. 7 is an illustration of a process flow for a method 700 to determine accessible pickup locations by determining edge crossings (e.g., step 410 of method 400), according to one example embodiment. In various embodiments, method 700 can include additional or fewer steps or the steps may be accomplished in another order. In various embodiments, method 700 can repeat any of the steps, or any series of steps, at any time.

PLD module 220 inputs a set of road segments (e.g., address matched road segments) and a requestor location and outputs a set of accessible road segments. For clarity, method 700 will be described for a particular road segment of the input road segments, but is applied to all road segments of the input road segments.

PLD module 220 accesses information describing a particular road segment of the input road segments from system datastore 230. The information includes a starting location, an ending location, and a location name for the road segment. The starting location is a coordinate describing one end of the road segment and the ending location is a coordinate describing the opposite end of the road segment. The location name is an alphanumeric string describing the location of the road segment.

PLD module 220 generates 702 an edge for the road segment using the starting location and ending location. An edge is a polyline describing the shape and location of the road segment in a virtual space. For example, a road segment has a starting location of $[x_1, y_1]$ and an ending location of $[x_2, y_2]$. Here, the edge for the road segment is a polyline connecting $[x_1, y_1]$ to $[x_2, y_2]$.

PLD module 220 classifies 704 each edge using the accessed location name for the road segment. Each edge may be classified as an unnamed edge or a named edge. An unnamed edge is an edge for a road segment with a null value for the location name and a named edge is an edge for a road segment with an alphanumeric string for a location name.

PLD module 220 generates 706 a path for each road segment. A path is a polyline connecting a coordinate (e.g., a location coordinate) to the edge representing the road segment. In one example, a path may be the shortest polyline from a coordinate to the edge. In some examples, PLD module 220 may also generate a path from the coordinate to multiple points on an edge. For example, a path may connect a coordinate to both the starting location and/or ending location of the edge, but could use any other locations on an edge. A path may also reflect a most likely walking path from the coordinate to the road segment. For example, a polyline may avoid buildings and/or follow sidewalks. In some examples, PLD module 220 may generate a path that is a range. A range can be thought of as any number of paths connecting a coordinate to any number of points on an edge. In an example where the number of paths approaches infinity, the range can be thought of as a path angle. The path angle is the angle between the starting location and ending location when measured from a coordinate and relative to a direction (e.g., north).

Figure 8:
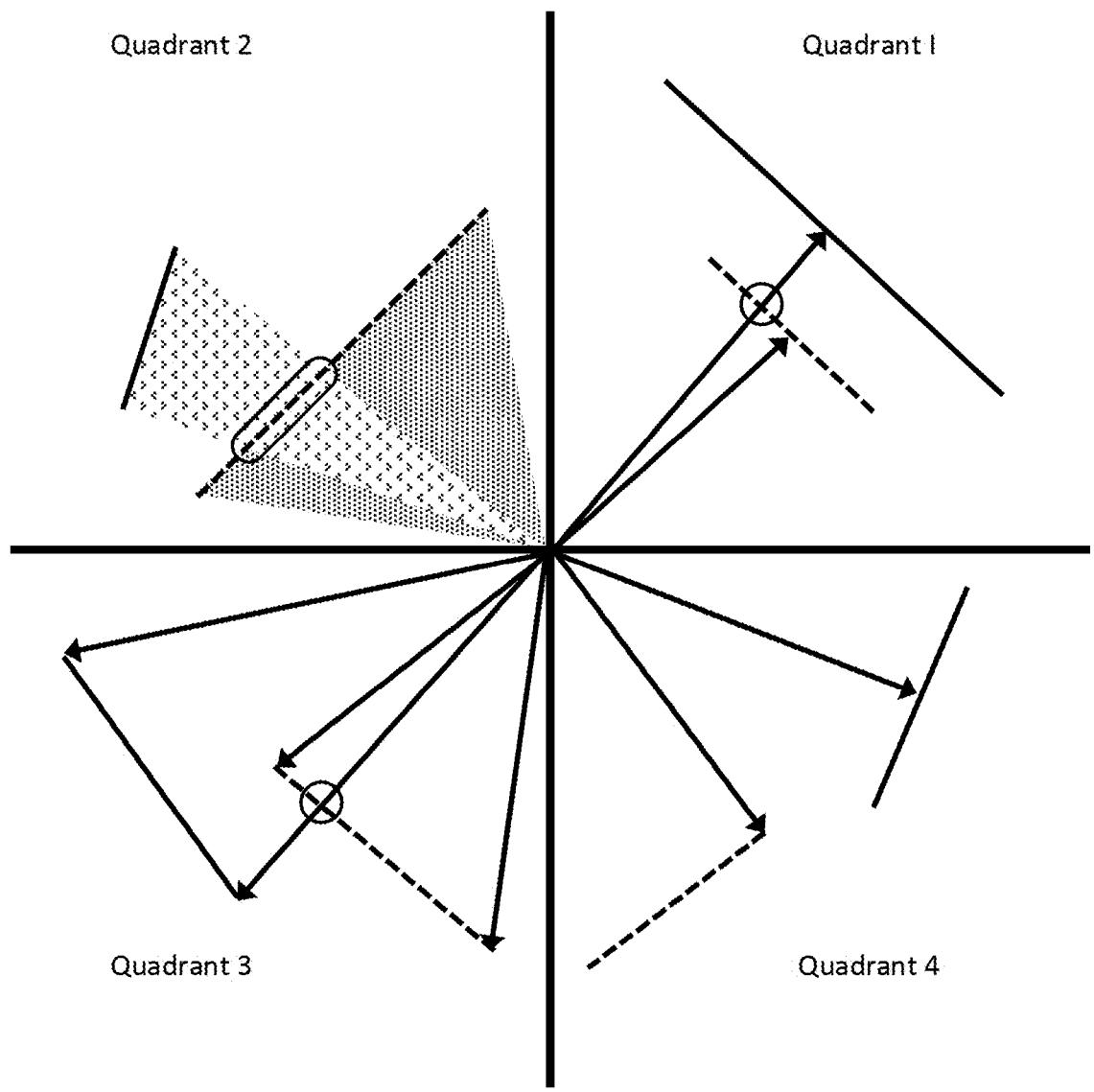
FIG. 8 is an illustration of edge crossings, according to one example embodiment.

PLD module 220 determines 708 a number of edge crossings for each road segment. An edge crossing is the number of times a path (or paths, or range) for a road segment crosses (or overlaps) an edge for another road segment of the input road segments. FIG. 8 is a diagram illustrating edge crossings, in some example embodiments. The diagram includes four quadrants surrounding a location coordinate. Each quadrant includes a first edge for a first road segment and a second edge for a second road segment. The first edge is in each quadrant is illustrated as a solid line and the second edge for each quadrant is illustrated as a dashed line. Each quadrant illustrates different types of paths that can connect a location coordinate to an edge. Paths are illustrated as an arrow and, in the case where the path is a range, a shaded area.

In FIG. 8, the first quadrant illustrates paths from the location coordinate to the midpoint of each edge. In this example, the first edge has one edge crossing while the second edge has zero edge crossings because the path for the first edge intersects the second edge. The second quadrant illustrates as that are ranges. Again, the first edge has one edge crossing while the second edge has zero edge crossings because the range for first edge overlaps the range for the second edge. The third quadrant illustrates paths from the location coordinate to the starting location and the ending location of each edge. Again the first edge has one edge crossing while the second edge has zero edge crossings because a path of the first edge intersects the second edge. The fourth quadrant shows paths from the location coordinate to the closest point of each edge. In this example, neither edge has an edge crossing because neither path intersects (or overlaps) an edge. In FIG. 8, all of the polylines for a path are illustrated as a straight line, but could also be non-linear.

In some configurations, PLD module 220 may classify an edge crossing based on the type of edge that a path crosses. For example, if a path crosses an unnamed edge, the edge crossing for that road segment is an unnamed edge crossing. Similarly, if a path crosses a named edge, the edge crossing for that road segment is a named edge.

PLD module 220 determines 710 accessible road segments based on the edge crossings for each road segment. In one example, PLD module 220 determines that input road segments having one or fewer edge crossings are accessible road segments. Other examples of determining accessible road segments are possible. For example, PLD module 220 may determine that road segments having one or fewer unnamed edge crossings are accessible road segments and/or PLD module 220 may determine that road segments having zero named edge crossings as accessible road segments. Additionally, PLD module 220 may have some other predetermined threshold number of edge crossings (e.g., two or fewer, five or fewer, etc.).

VI. Example Computer System

Figure 9:
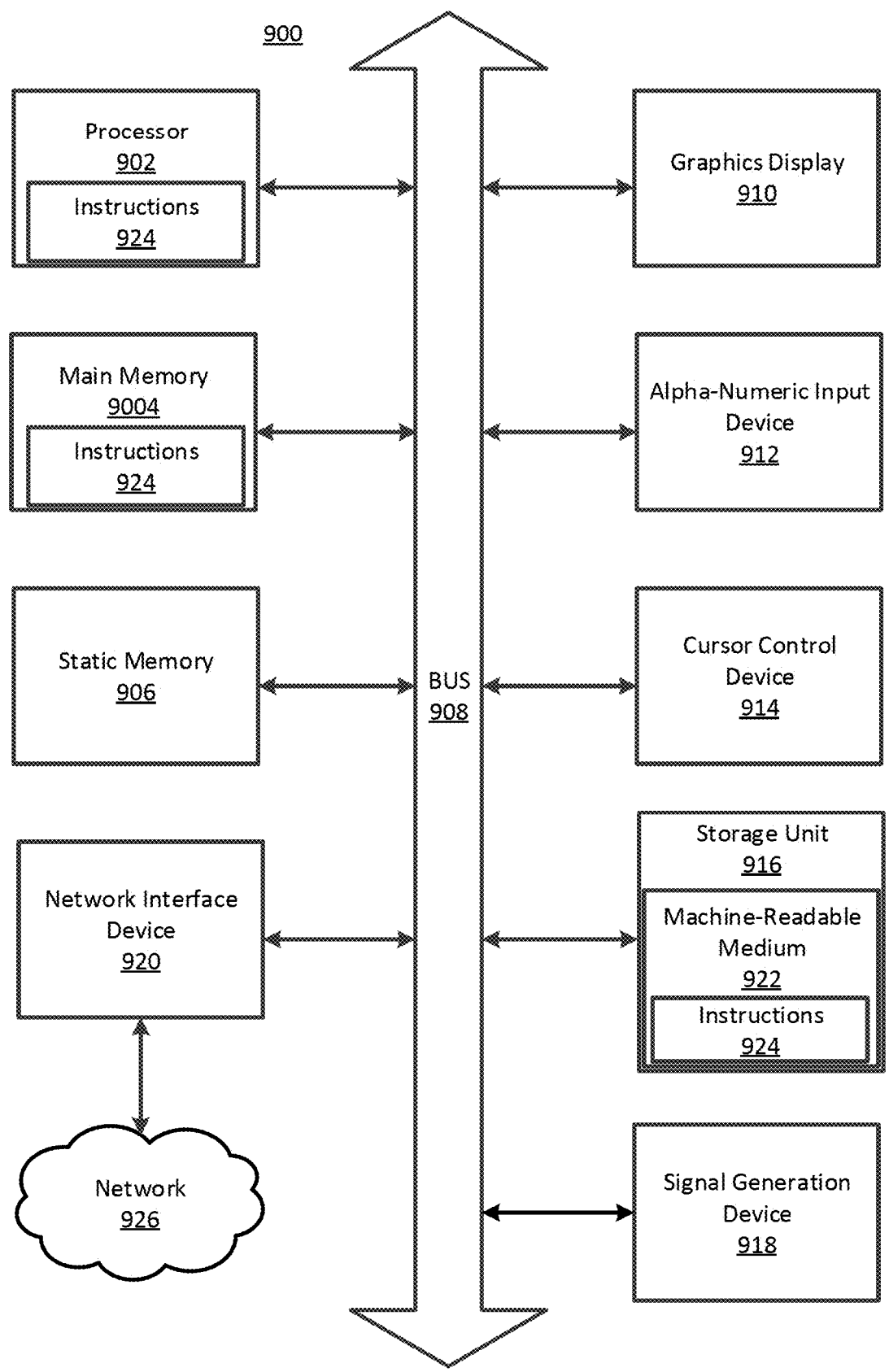
FIG. 9 is a block diagram illustrating components of an example machine for reading and executing instructions from a machine-readable medium, according to one example embodiment.

FIG. 9 is a block diagram illustrating components of an example machine for reading and executing instructions from a machine-readable medium. Specifically, FIG. 1 shows a diagrammatic representation of network system 130 and client device 110 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the system 130 described in FIG. 1. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 (e.g., network 120) via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

VII. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-executed method for determining a suggested pickup location, the method comprising:
   receiving a request for transport service from a service requestor, the request including a requestor location name and a requestor location coordinate;
   determining a set of nearby road segments of a plurality of road segments, the set of nearby road segments within a threshold distance from the requestor location coordinate;
   determining a set of navigable road segments of the set of nearby road segments, each road segment in the set of navigable road segments including a pickup location where a transportation vehicle of a service provider providing transport service can stop;
   determining a set of address matched road segments of the set of navigable road segments, each of the set of address matched road segments having a location name similar to the requestor location name;
   determining a set of accessible road segments of the set of address matched road segments, the set of accessible road segments having one or fewer edge crossings, an edge crossing representing a number of times the service requestor crosses a road segment when travelling to an address matched road segment;
   selecting a road segment of the set of accessible road segments that is nearest the service requestor location as the suggested pickup location; and
   transmitting a route from the suggested pickup location to a destination location to a service provider.

2. The method of claim 1, further comprising:
   determining a pickup location on the selected road segment, the suggested pickup location representing a coordinate of the selected pickup location.

3. The method of claim 2, wherein the coordinate is the coordinate closest to the requestor location.

4. The method of claim 2, wherein the coordinate is the midpoint of the selected road segment.

5. The method of claim 2, wherein the coordinate is the coordinate of the shortest walking distance to the requestor location.

6. The method of claim 1, wherein determining a set of nearby road segments further comprises:
   accessing the threshold distance from a system datastore.

7. The method of claim 1, wherein determining a set of nearby road segments further comprises:
   determining a threshold distance based on the density of road segments near the requestor coordinate.

8. The method of claim 1, wherein a particular number of nearby road segments is determined and the particular number is accessed from a system datastore.

9. The method of claim 1, wherein determining a set of address matched road segments comprises determining any of an edit distance ratio score, a relative edit distance score, an alphanumeric edit distance score and a numeric edit distance score.

10. The method of claim 1, wherein determining a set of navigable road segments, further comprises:
    accessing a road type for each of the nearby road segments;
    determining whether each nearby road segments has a navigable or unnavigable road type; and
    selecting nearby road segments with a navigable road type as navigable road segments.

11. The method of claim 1, wherein unnavigable road types include any of a controlled access road, a ferry, a bridge, a ramp, a tunnel, an HOV road, an intersection, or a roundabout.

12. The method of claim 1, wherein determining accessible road segments further comprises:
    determining an edge for each address matched road segment, the edge representing the road segment in space;
    determining a path for address matched road segment, a path representing a path from the requestor location coordinate to the address matched road segment;
    determining an edge crossing for each address matched road segment, an edge crossing indicating that a path for the edge intersects an edge of any other address matched road segment;
    selecting addressed matched edge crossings having one or fewer edge crossings as accessible road segments.

13. The method of claim 9, wherein each path reflects a walking path of a service requestor from the requestor location coordinate to the address matched road segment.

14. The method of claim 1, wherein the accessible road segments are nearer the service requestor location than a set of bounding road segments, the set of bounding road segments surrounding the requestor location.

15. A non-transitory computer-readable storage medium storing computer instructions, the computer instructions, when executed by one or more processors, cause the one or more processors to:
receive a request for transport service from a service requestor, the request including a requestor location name and a requestor location coordinate;
determine a set of nearby road segments of a plurality of road segments, the set of nearby road segments within a threshold distance from the requestor location coordinate;
determine a set of navigable road segments of the set of nearby road segments, each road segment in the set of navigable road segments including a pickup location where a transportation vehicle of a service provider providing transport service can stop;
determine a set of address matched road segments of the set of navigable road segments, each of the set of address matched road segments having a location name similar to the requestor location name;
determine a set of accessible road segments of the set of address matched road segments, the set of accessible road segments having one or fewer edge crossings, an edge crossing representing a number of times the service requestor crosses a road segment when travelling to an address matched road segment;
select a road segment of the set of accessible road segments that is nearest the service requestor location as the suggested pickup location; and
transmit a route from the suggested pickup location to a destination location to a service provider.

16. The non-transitory computer-readable storage medium 15, wherein the computer instructions further cause the one or more processors to:
determine a pickup location on the selected road segment, the suggested pickup location representing a coordinate of the selected pickup location.

17. The non-transitory computer-readable storage medium 15, wherein the coordinate is any of the midpoint of the selected road segment, the shortest walking distance to the requestor locations, or closest to the requestor location.

18. The non-transitory computer-readable storage medium 15, wherein the computer instructions that, when executed, cause the one or more processors to determine a set of address matched road segments, further cause the one or more processors to determine any of an edit distance ratio score, a relative edit distance score, an alphanumeric edit distance score and a numeric edit distance score.

19. The method of claim 1, wherein the computer instructions that, when executed, cause the processor to determine a set of navigable road segments, further cause the processor to:
access a road type for each of the nearby road segments;
determine whether each nearby road segments has a navigable or unnavigable road type; and
select nearby road segments with a navigable road type as navigable road segments.

20. A system for executing a method, the system comprising:
one or more processors; and
a non-transitory, computer-readable storage medium stores computer program modules executable by one or more processors to perform steps comprising:
receiving a request for transport service from a service requestor, the request including a requestor location name and a requestor location coordinate;
determining a set of nearby road segments of a plurality of road segments, the set of nearby road segments within a threshold distance from the requestor location coordinate;
determining a set of navigable road segments of the set of nearby road segments, each road segment in the set of navigable road segments including a pickup location where a transportation vehicle of a service provider providing transport service can stop;
determining a set of address matched road segments of the set of navigable road segments, each of the set of address matched road segments having a location name similar to the requestor location name;
determining a set of accessible road segments of the set of address matched road segments, the set of accessible road segments having one or fewer edge crossings, an edge crossing representing a number of times the service requestor crosses a road segment when travelling to an address matched road segment;
selecting a road segment of the set of accessible road segments that is nearest the service requestor location as the suggested pickup location; and
transmitting a route from the suggested pickup location to a destination location to a service provider.

* * * * *

UNITED STATES PATENT AND TRADEMARK OFFICE
CERTIFICATE OF CORRECTION

PATENT NO. : 10,845,206 B2
APPLICATION NO. : 16/234281
DATED : November 24, 2020
INVENTOR(S) : Tumuluru et al.

It is certified that error appears in the above-identified patent and that said Letters Patent is hereby corrected as shown below:

On the Title Page

Under Inventors (72) delete "Atrem Kizil" and insert --Artem Kizil--

In the Claims

In Column 21, in Claim 16, Line 40, delete "medium 15," and insert --medium of claim 15,--
In Column 21, in Claim 17, Line 46, delete "medium 15," and insert --medium of claim 15,--
In Column 21, in Claim 18, Line 50, delete "medium 15," and insert --medium of claim 15,--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*